United States Patent [19]

Sommer et al.

[11] Patent Number: 5,457,018

[45] Date of Patent: Oct. 10, 1995

[54] SHAPED PLASTIC ARTICLE

[75] Inventors: Klaus Sommer, Pittsburgh, Pa.; Leo Morbitzer, Köln, Germany; Louis Bollens, Begijnendijk; Marc Stevens, Belsele, both of Belgium; Rüdiger Plaetschke, Leverkusen; Alfred Pischtschan, Kürten, both of Germany

[73] Assignee: Agfa Gevaert AG, Leverkusen, Germany

[21] Appl. No.: 337,888

[22] Filed: Nov. 14, 1994

[30] Foreign Application Priority Data

Nov. 24, 1993 [DE] Germany .......................... 43 39 983.5

[51] Int. Cl.$^6$ .................................................... G03C 1/76
[52] U.S. Cl. .......................... 430/533; 430/496; 430/523; 430/950; 430/531; 430/537; 428/36.5
[58] Field of Search ....................................... 430/533, 496, 430/523, 531, 533, 537, 950; 428/36.5

[56] References Cited

U.S. PATENT DOCUMENTS

| 4,187,113 | 2/1980 | Mathews et al. ........................ 430/533 |
| 4,221,700 | 9/1980 | Minagawa et al. .............. 260/45.7 PH |
| 4,320,207 | 3/1982 | Watanabe et al. ........................ 521/54 |
| 5,143,765 | 9/1992 | Maier et al. ............................ 428/36.5 |
| 5,223,383 | 6/1993 | Maier et al. ............................ 430/533 |
| 5,334,457 | 8/1994 | Wada et al. ............................ 430/533 |

OTHER PUBLICATIONS

Encyclopedia of Polymer Science and Engineering, vol. 12, Polyesters, Films, pp. 193–216, 1988, John Wiley & Sons.

*Primary Examiner*—Thomas R. Neville
*Attorney, Agent, or Firm*—Connolly & Hutz

[57] ABSTRACT

A shaped article, in particular a support for image information layers prepared from a biaxially stretched film prepared from a polymer blend of 50 to 97 wt.% of a linear polyester and 3 to 50 wt.% of a polymer containing styrene, wherein the percentages relate to the sum of polyester and polymer containing styrene, is characterised by particularly-elevated covering power.

10 Claims, No Drawings

SHAPED PLASTIC ARTICLE

The present invention relates to a shaped article, in particular a support for image information layers, for example a printing film for thermal sublimation printing and the like, but in particular a photographic support material based on a biaxially stretched polyester film, which is suitable for the production of photographic print materials.

Customarily used supports for photographic prints are paper coated with barium sulphate (barytes paper) or paper coated on both sides with polyethylene (PE paper).

Due to its elevated water absorption during processing of the exposed material, barytes paper is not suitable for rapid processing. PE paper is relatively expensive. Frequent attempts have thus been made to replace PE paper with a lower cost support. It has thus already been proposed (U.S. Pat. No. 4,187,113) to provide a polyester film as a photographic support, wherein the polyester is blended with a homo- or copolymer of ethylene and propylene which is incompatible with the polyester, the polymer blend is processed into a film and then this is biaxially stretched.

It is known that minute cavities are produced in the film on stretching, which cavities scatter incident light and should thus ensure adequate covering power. However, these films do not achieve the covering power obtained with a PE paper.

It is also known from U.S. Pat. No. 5,143,765, which moreover also contains a comprehensive review of the prior art, to produce moulded articles from a continuous, oriented polymer matrix, in which microdroplets of another polymer are dispersed, some of which are enclosed in a cavity. The moulded articles, for example films for photographic recording materials, are characterised by low density and good whiteness. The microdroplet polymers are substantially crosslinked and are coated with a lubricant. Production of a dispersion of the microdroplets is costly. The mouldings are produced by producing a blend of the matrix polymer melt with the crosslinked microdroplets, processing it into a moulding and orienting the moulding by stretching.

The covering power of such films is still inadequate.

Moreover, the material is not sufficiently crease resistant.

The object of the invention was to provide a shaped article, in particular a support for image information layers, in particular a photographic support material based on a polyester, which has improved covering power, at least matching the performance of a PE paper in this respect and is characterised by good crease resistance.

This object is achieved with a polyester polymer blend in which the added polymer is a polymer containing styrene, for example an acrylonitrile/butadiene/styrene graft copolymer (ABS), a styrene/acrylonitrile copolymer (SAN) or a high impact polystyrene (HIPS), preferably however ABS.

The present invention thus provides a shaped article, in particular a support for image information layers, preferably a photographic support material, which is a biaxially stretched film prepared from a polymer blend of 50 to 97 wt.% of a linear polyester and 3 to 50 wt.% of a polymer containing styrene, which is not crosslinked in the portion containing styrene, wherein the percentages relate to the sum of polyester and polymer-containing styrene.

The polyester preferably constitutes 77 to 88 wt.% and the polymer containing styrene 12 to 23 wt.%.

The linear polyester component of the film may consist of any thermoplastic, film-forming polyester, which may be obtained by condensation of one or more dicarboxylic acids or the lower dialkyl esters thereof, such as for example terephthalic acid, isophthalic acid, phthalic acid, 2,5-, 2,6- or 2,7-naphthalenedicarboxylic acid, succinic acid, sebacic acid, adipic acid, azelaic acid, bibenzoic acid, sulphoisophthalic acid and hexahydroterephthalic acid or bis-p-carboxyphenoxyethane, with 1 or more glycols, such as ethylene glycol, 1,3-propanediol, 1,4-butanediol, neopentyl glycol, diethylene glycol, 1,4-cyclohexanedimethanol, polyethylene glycol and polyethylene-substituted diols with ether side-groups with and without terminal sulphone groups. Copolyesters and polyester blends may also be used. The preferred polyester contains at least 80 wt.% polyethylene terephthalate and may contain up to 20 wt.% polyethylene isophthalate.

The polymer containing styrene preferably contains 54 to 63 wt.% styrene and 12.5 to 25 wt.% of an elastomer, for example polybutadiene. The remainder to 100 wt.% is acrylonitrile.

SAN resins which may be used according to the invention preferably contain 5 to 30 wt.% acrylonitrile.

HIPS is a multiphase system prepared from 88–94 wt.% styrene ($M_w$ ~250,000) and 6–12 wt.% polybutadiene.

The preferably used ABS plastics are two-phase plastics prepared from

1.) a thermoplastic copolymer of styrene and acrylonitrile, in which some of the styrene may be replaced with α-methylstyrene or methyl methacrylate; this copolymer, also described as the SAN resin or resin matrix, constitutes the external phase;

2.) at least one graft polymer produced by a grafting reaction of one or more of the monomers stated under 1) onto a butadiene homo- or copolymer ("grafting backbone"). This graft polymer ("elastomer phase" or "grafting rubber") constitutes the disperse phase in the matrix resin.

The polymers stated in 1) and 2) are produced using known processes, for example emulsion, solution, bulk, suspension or precipitation polymerisation or by a combination of such processes.

ABS polymers pursuant to the invention contain 5 to 100 wt.%, preferably 5 to 80 wt.%, of a graft polymer and 95 to 0 wt.%, preferably 95 to 20 wt.%, of a thermoplastic copolymer resin.

Graft polymers pursuant to the invention are those in which styrene or mixtures of 95–50 wt.% of styrene and 5 to 50 wt.% of acrylonitrile, methacrylonitrile, maleic anhydride, N-substituted maleimides or mixtures thereof are grafted onto a rubber, wherein the percentages relate to the sum of styrene (or styrene replacement) and the other mixture constituents, and wherein styrene may be partially replaced with α-methylstyrene, ring-substituted styrene or methyl methacrylate. Suitable rubbers are virtually all rubbers with glass transition temperatures of ≦10° C., for example polybutadiene, styrene/butadiene copolymers, acrylonitrile/butadiene copolymers, polyisoprene, alkyl acrylate rubbers, such as for example poly-n-butyl acrylate.

The alkyl acrylate rubbers may optionally contain up to 30 wt.% (related to the weight of the rubber) of copolymerised monomers such as vinyl acetate, acrylonitrile, styrene, methyl methacrylate and/or vinyl ethers. The alkyl acrylate rubbers may furthermore contain smaller quantities, preferably up to 5 wt.% (related to the weight of the rubber) of ethylenically unsaturated monomers with a crosslinking action. Such crosslinking agents are, for example, alkylene diol diacrylates and methacrylates, polyester diacrylates and methacrylates, divinylbenzene, trivinylbenzene, triallyl cyanurate, allyl acrylate and methacrylate, butadiene and isoprene.

The grafting backbone may also be acrylate rubbers with a core/shell structure with a core of crosslinked diene rubber prepared from one or more conjugated dienes, such as polybutadiene, or a copolymer of a conjugated diene with an ethylenically unsaturated monomer such as styrene and/or acrylonitrile.

Further suitable rubbers are, for example, the so-called EPDM rubbers (polymers of ethylene, propylene and an unconjugated diene, such as for example dicyclopentadiene), EPM rubbers (ethylene/propylene rubbers) and silicone rubbers, which may also optionally have a core/shell structure. Polybutadiene and alkyl acrylate rubbers are preferred.

The graft polymers contain 10 to 95 wt % in particular 20 to 70 wt % rubber and 90 to 5 wt % in particular 80 to 30 wt.%, graft copolymerised monomers. The rubbers are present in these graft copolymers in the form of at least partially crosslinked particles of an average particle diameter ($d_{50}$) of 0.05 to 20.0 µm, preferably of 0.1 to 2.0 µm and particularly preferably of 0.1 to 0.8 µm.

Such graft copolymers may be produced by free-radical graft copolymerisation of monomers from the series styrene, α-methylstyrene, ring-substituted styrene, (meth)acrylonitrile, methyl methacrylate, maleic anhydride, N-substituted maleimide in the presence of the rubbers to be grafted.

The thermoplastic copolymers are also produced as a by-product of graft copolymerisation. It is customary, additionally to add separately produced copolymers to the copolymers contained in the graft polymer. These separately produced copolymers are not necessarily chemically identical to the ungrafted portions of the resin present in the graft polymers.

Suitable separately produced copolymers are resinous, thermoplastic and contain no rubber; they are in particular copolymers of styrene and/or α-methylstyrene with acrylonitrile, optionally mixed with methyl methacrylate.

Particularly preferred copolymers consist of 20 to 40 wt.% acrylonitrile and 80 to 60 wt.% styrene or α-methylstyrene. Such copolymers are known and may, in particular, be produced by free-radical polymerisation, in particular by emulsion, suspension, solution or bulk polymerisation. The copolymers preferably have molecular weights $\bar{M}_w$ of 15,000 to 2·10⁵.

Suitable examples of components are the subsequently described graft copolymers A) and B), together with the resins C) and D).

A) Graft rubbers prepared from 50 wt.% polybutadiene with an average particle diameter ($d_{50}$) of 0.4 µm, which have been grafted with 36 wt.% of styrene and 14 wt.% of acrylonitrile.

B) Graft rubber prepared from 50 wt.% polybutadiene with an average particle diameter ($d_{50}$) of 0.1 µm, which have been grafted with 36 wt.% of styrene and 14 wt.% of acrylonitrile.

c) Copolymer prepared from 72 wt.% styrene and 28 wt.% acrylonitrile (SAN) with an $\bar{M}_w$ of approximately 115,000 with $U=\bar{M}_w/\bar{M}_n-1 \leq 2$ (molecular polydispersity).

D) Copolymer prepared from 72 wt.% styrene and 28 wt.% acrylonitrile (SAN) with an $\bar{M}_w$ of approximately 77,000 with $U=\bar{M}_w/\bar{M}_n-1 \leq 2$ (molecular polydispersity).

Suitable examples of graft copolymers which may also be used according to the invention are the products ABS-1 and ABS-2 described below.

ABS-1 is a high temperature resistant grade of ABS with elevated flowability. It consists of 26 wt.% of a graft rubber prepared from 50 wt.% polybutadiene, 36 wt.% styrene and 14 wt.% acrylonitrile and 74 wt.% of a resin phase prepared from a copolymer of 72 wt.% α-methylstyrene and 28 wt.% acrylonitrile, of which 15 wt.% is replaced with a copolymer prepared from 72 wt.% styrene and 28 wt.% acrylonitrile. The resin phase has an $\bar{M}_w$ of approximately 77,000 and a $U=\bar{M}_w/\bar{M}_n \leq 1$ of $\leq 2$.

ABS-2 consists of 37.5 wt.% of the same graft rubber as ABS-1. The resin phase is a copolymer prepared from 72 wt.% styrene and 28 wt.% acrylonitrile with $\bar{M}_w$ of approximately 115,000.

The polybutadiene consists of equal parts of polybutadiene with $d_{50}$ of approximately 400 nm and polybutadiene with $d_{50}$ of approximately 100 nm.

Both grades of ABS contain customary processing auxiliaries and antioxidants.

HIPS is a blend of 88 to 94 wt.% polystyrene ($\bar{M}_w$ ~250,000) and 12 to 6 wt.% polybutadiene.

The graft copolymer preferably has the following characteristics:

Gel fraction of the grafting backbone $\geq 70\%$, preferably $\geq 80\%$ (measured in toluene); degree of grafting G 0.15 to 0.55 and an average particle diameter $d_{50}$ of 0.07 to 0.6 µm, preferably 0.1 to 0.4 µm.

The grafting backbone may also contain, in addition to butadiene residues, up to 30 wt.% of residues of other α,β-ethylenically unsaturated monomers, such as for example styrene, acrylonitrile, esters of acrylic or methacrylic acid with 1–4 C atoms in the alcohol component (such as methyl acrylate, ethyl acrylate, methyl methacrylate, ethyl methacrylate). The preferred grafting backbone II consists of pure polybutadiene.

Since, as is known, the graft monomers are not necessarily entirely grafted, onto the grafting backbone during the grafting reaction, graft polymers according to the invention are also taken to be homo- and copolymers of the grafting monomers used as well as the actual graft polymers. The degree of grafting G describes the ratio by weight of grafted styrene/acrylonitrile to the grafting backbone and is dimensionless.

The average particle size $d_{50}$ is the diameter both above and below which are found 50 wt.% of the particles.

The average particle diameter may be determined by ultracentrifuge measurements (W. Scholtan, H. Lange, *Kolloid Z. & Z. Polymere* 250 (1972), 782–796) or by means of electron microscopy and subsequent particle counting (G. Kämpf, H. Schuster, *Angew. Makromolekulare Chemie* 14 (1970), 111–129).

The graft polymers may be produced using per se known methods, for example by emulsion polymerisation or the latex suspension process, with the assistance of radical-forming polymerisation initiators in a polybutadiene or butadiene copolymer latex.

The processes for the production of ABS graft polymers are known.

The blend of polyester and polymer containing styrene may be produced in customary mixing units such as roll mills, kneaders, single and multi-screw extruders. Double screw extruders and kneaders are particularly suitable.

The blends may be produced on the stated mixing units by melting and homogenising both components together or by incorporating the styrene polymer into the polyester melt.

The temperature during production of the blends should be at least 10° C. above the mixing melting points of the polyesters and below 350° C., preferably between 245 and 280° C.

The styrene polymer is immiscible with the polyester component and, under the range of mixing conditions used according to the invention, is present as the disperse phase. The polyester constitutes the continuous phase.

If the shaped article is a film, for example a support for image information layers, produced by extrusion of the polymer blend, the procedure used is as follows:

Extrusion, chilling and stretching of the film may be performed by any known prior art process for the production of an oriented polyester film, for example by a flat film process or by a blown or tubular film process. The flat film process is preferred for the production of films according to the invention. In this process, the blend is extruded through a slot die; the extruded web is chilled on a cooled casting roll, such that the polyester component of the film is chilled in an amorphous state. The chilled film is then biaxially oriented, namely by stretching in directions at right angles to each other at a temperature above the glass/rubber transition temperature of the polyester. In general, the film is stretched first in one direction and then in the second direction, although stretching may optionally be performed in both directions simultaneously. In a typical process, the film is first stretched in the machine direction by a group of rotating rollers or between a pair of nip rollers and is then stretched transversely in a transverse stretching unit. The film may be stretched in each direction by 2 to 5 times, preferably 2.8 to 3.5 times the original dimensions. In the case of multi-layer films, layers may also be applied after longitudinal stretching and before transverse stretching.

The longitudinal stretching temperature has a substantial influence during stretching and it is possible to vary the gravimetric density (as opposed to optical density) over a wide range by varying this temperature.

The transverse stretching temperature used is advantageously below the glass transition temperature of the polymer containing styrene, for example of the styrene/acrylonitrile resin, by which means, despite a considerable reduction in gravimetric density (which allows considerable savings of material to be made), very good mechanical properties (crease resistance) are achieved.

The longitudinal stretching temperature is adjusted to a value between $T_g$ and $T_g+10K$, so producing the greatest possible stretching stresses.

Once the film has been transverse stretched, it is heat-set by heating to a temperature which is sufficient to crystallise the polyester, while contraction of the film in the two directions of stretching is prevented.

The heat-setting temperature should be no higher than 230° C., preferably no higher than 200° C.

The support material according to the invention may contain further additives, for example pigments, in particular $TiO_2$, $BaSO_4$, $CaCO_3$, optical whiteners or blue dyes, which further increase covering power and improve sharpness, in particular 0.5 to 10 wt.%, related to the total weight of the constituent used, preferably 2 to 10, preferably 3.5 to 6.5 wt. % of $TiO_2$ pigment, preferably of the anatase type, are added.

In a preferred embodiment of the invention, a layer of polyester is applied to at least one side of the extruded film after extrusion or by coextrusion, in particular the same polyester which contains no copolymer containing styrene, which is not crosslinked in the portion containing styrene, or a mixture of polyester with additives.

While the thickness of the film without an additional layer in the stretched state is in particular 160 to 190 μm, the thickness of the additional layer is preferably 1 to 50 μm, in particular 5 to 20 μm. The additional layer may consist of up to 25 wt.% of a white pigment, for example titanium dioxide of the rutile or, in particular, anatase type.

The support according to the invention exhibits a texture which is remarkably similar to paper and is therefore suitable as a replacement for paper, in particular as a base for photographic papers, i.e. as a replacement for PE paper.

The support according to the invention is furthermore suitable for dry imaging processes, thermal sublimation printing, delamination processes, electrophotography, ink-jet processes.

The invention thus also provides a photographic material with a support and at least one silver halide emulsion layer applied thereto, characterised in that the support material according to the invention is used as the support.

The photographic material may be a black and white or colour print material. The material is preferably a colour photographic material.

Colour photographic materials customarily contain at least one red-sensitive, one green-sensitive and one blue-sensitive silver halide emulsion layer, optionally together with interlayers and protective layers.

Essential constituents of the photographic emulsion layers are the binder, silver halide grains and colour couplers.

Preferably, gelatine is used as the binder. Gelatine may, however, be entirely or partially replaced with other synthetic, semi-synthetic or also naturally occurring polymers. Synthetic gelatine substitutes are, for example, polyvinyl alcohol, poly-N-vinyl pyrrolidone polyacrylamides, polyacrylic-acid and the derivatives thereof, in particular the copolymers thereof. Naturally occurring gelatine substitutes are, for example, other proteins such as albumin or casein, cellulose, sugar, starch or alginates. Semi-synthetic gelatine substitutes are usually modified natural products. Cellulose derivatives such as hydroxyalkyl cellulose, carboxymethyl cellulose and phthalyl cellulose together with gelatine derivatives obtained by reaction with akylating or acylating agents or by grafting polymerisable monomers, are examples of such products.

The binders should have a sufficient quantity of functional groups available so that satisfactorily resistant layers may be produced by reaction with suitable hardeners. Such functional groups are in particular amino groups, but also carboxyl groups, hydroxyl groups and active methylene groups.

The preferably used gelatine may be obtained by acid or alkaline digestion. Oxidised gelatine may also be used. The production of such gelatines is described, for example, in *The Science and Technology of Gelatine*, edited by A. G. Ward and A. Courts, Academic Press 1977, pages 295 et seq. The gelatine used in each case should have the lowest possible content of photographically active impurities (inert gelatine). Gelatines with high viscosity and low swelling are particularly advantageous.

The silver halide present in the photographic material as the photosensitive constituent may contain chloride, bromide or iodide or mixtures thereof as the halide. For example, the halide content of at least one layer may consist of 0 to 15 mol.% iodide, 0 to 100 mol.% chloride and 0 to 100 mol.% bromide. In the case of colour negative and colour reversal films, silver bromide-iodide emulsions are customarily used, in the case of colour negative and colour reversal paper silver chloride-bromide emulsions with a high chloride content up to pure silver chloride emulsions are customarily used. The crystals may be predominantly compact, for example regularly cubic or octahedral or they may have transitional shapes. Preferably, however, lamellar crystals may also be present, the average ratio of diameter to thickness of which is preferably at least 5:1, wherein the diameter of a grain is defined as the diameter of a circle the contents of which correspond to the projected surface area of the grain. The layers may, however, also have tabular silver halide crystals, in which the ratio of diameter to thickness is substantially greater than 5:1, for example 12:1 to 30:1.

The silver halide grains may also have a multi-layered grain structure, in the simplest case with one internal zone and one external zone of the grain (core/shell), wherein the halide composition and/or other modifications, such as for example doping, of the individual grain zones are different. The average grain size of the emulsions is preferably between 0.2 μm and 2.0 μm, the grain size distribution may be both homodisperse and heterodisperse. A homodisperse grain size distribution means that 95% of the grains do not deviate by more than ±30% from the average grain size. The emulsions may, in addition to the silver halide, also contain organic silver salts, for example silver benzotriazolate or silver behenate.

Two or more types of silver halide emulsions which are produced separately may be used as a mixture.

The silver halide emulsion is generally subjected to chemical sensitisation under defined conditions—pH, pAg, temperature, gelatine concentration, silver halide concentration and sensitiser concentration—until the optimum sensitivity and fog are achieved. The procedure is described in, for example, H. Frieser, *Die Grundlagen der Photographischen Prozesse mit Silberhalogeniden*, pages 675–734, Akademische Verlagsgesellschaft (1968).

Chemical sensitisation may here proceed with the addition of compounds of sulphur, selenium, tellurium and/or compounds of metals of subgroup VIII of the periodic table (e.g. gold, platinum, palladium, iridium), furthermore there may be added thiocyanate compounds, surface-active compounds, such as thioethers, heterocyclic nitrogen compounds (for example imidazoles, azaindenes) or also spectral sensitisers ( described, for example, in F. Hamer, *The Cyanine Dyes and Related Compounds*, 1964, or *Ullmanns Encyclopdie der technischen Chemie*, 4th edition, volume 18, pages 431 et seq, and *Research Disclosure* 1 7643 (December 1978 ), section III) . Alternatively or additionally, reduction sensitisation may be performed by adding reducing agents (tin(II) salts, amines, hydrazine derivatives, aminoboranes, silanes, formamidinesulphinic acid), by hydrogen, by low pAg (for example, less than 5) and/or high pH (for example, greater than 8).

The photographic emulsions may contain compounds to prevent fogging or to stabilise the photographic function during production, storage or photographic processing.

Particularly suitable are azaindenes, preferably tetra- and pentaazaindenes, particularly those substituted with hydroxyl or amino groups. Such compounds have been described, for example, by Birr, Z. *Wiss. Phot.*, 47, (1952), pages 2–58. Furthermore, salts of metals such as mercury or cadmium, aromatic sulphonic or sulphinic acids such as benzenesulphinic acid, or heterocyclics containing nitrogen such as nitrobenzimidazole, nitroindazole, optionally substituted benzotriazoles or benzothiazolium salts may also be used as anti-fogging agents. Particularly suitable are heterocyclics containing mercapto groups, for example mercaptobenzothiazoles, mercaptobenzimidazoles, mercaptotetrazoles, mercaptothiadiazoles, mercaptopyrimidines, wherein these mercaptoazoles may also contain a water solubilising group, for example a carboxyl group or sulpho group. Further suitable compounds are published in *Research Disclosure* 17643 (December 1978), section VI.

The stabilisers may be added to the silver halide emulsions before, during or after ripening of the emulsions. Naturally, the compounds may also be added to other photographic layers which are associated with a silver halide layer.

Mixtures of two or more of the stated compounds may also be used.

The photographic emulsion layers or other hydrophilic colloidal layers of the photosensitive material produced according to the invention may contain surface-active agents for various purposes, such as coating auxiliaries, to prevent formation of electric charges, to improve sliding properties, to emulsify the dispersion, to prevent adhesion and to improve photographic characteristics (e.g. acceleration of development, greater contrast, sensitisation etc.). Apart from natural surface-active compounds, for example saponin, it is mainly synthetic surface-active compounds (surfactants) which are used: non-ionic surfactants,-for example alkylene oxide compounds, glycerol compounds or glycidol compounds, cationic surfactants, for example higher alkylamines, quaternary ammonium salts, pyridine compounds and other heterocyclic compounds, sulphonium compounds or phosphonium compounds, anionic surfactants containing an acid group, e.g. carboxylic acid, sulphonic acid, a phosphoric acid, sulphuric acid ester or phosphoric acid ester group, ampholytic surfactants, for example amino acid and aminosulphonic acid compounds together with sulphuric or phosphoric acid esters of an amino alcohol.

The photographic emulsions may be spectrally sensitised by using methine dyes or other dyes. Particularly suitable dyes are cyanine dyes, merocyanine dyes and complex merocyanine dyes.

A review of the polymethine dyes suitable as spectral sensitisers, the suitable combinations of the dyes and the combinations with supersensitising effects is contained in *Research Disclosure* 17643 (December 1978), section IV.

In particular, the following dyes-classified by spectral range—are suitable:

1. as red sensitisers 9-ethylcarbocyanines with benzothiazole, benzoselenazole or naphthothiazole as basic terminal groups, which may be substituted in 5th and/or 6th position by halogen, methyl, methoxy, carbalkoxy, aryl, together with 9-ethyl-naphthoxathia- or -selenocarbocyanines and 9-ethyl-naphthothiaoxa- or -benzoimidazocarbocyanines, provided that the dyes bear at least one sulphoalkyl group on the heterocyclic nitrogen.

2. as green sensitisers 9-ethylcarbocyanines with benzoxazole, naphthoxazole or a benzoxazole and a benzothiazole as basic terminal groups, together with benzimidazolecarbocyanines, which may also be further substituted and must also contain at least one sulphoalkyl group on the heterocyclic nitrogen.

3. as blue sensitisers symmetrical or asymmetrical benzimidiazo-, oxa-, thiaor selenocyanines with at least one sulphoalkyl group on the heterocyclic nitrogen and optionally further substituents on the aromatic ring, together with apomerocyanines with a rhodanine group.

Sensitisers may be dispensed with if the intrinsic sensitivity of the silver halide is sufficient for a specific spectral range, for example the blue sensitivity of silver bromides.

The differently sensitised emulsion layers are associated with non-diffusing monomeric or polymeric colour couplers which may be located in the same layer or in an adjacent layer. Usually, cyan couplers are associated with the red-sensitive layers, magenta couplers with the green-sensitive layers and yellow couplers with the blue-sensitive layers.

Colour couplers to produce the cyan partial colour image are generally couplers of the phenol or α-naphthol type.

Colour couplers to produce the yellow partial colour image are generally couplers with an open-chain ketomethylene grouping, in particular couplers of the α-acylacetamide type; suitable examples of these couplers are α-benzoylacetanilide couplers and α-pivaloylacetanilide couplers.

Colour couplers to produce the magenta-partial colour image are customarily couplers of the pyrazolone type or of the pyrazoloazole type, in particular of the pyrazolotriazole type.

The colour couplers may be 4-equivalent couplers, but they may also be 2-equivalent couplers. The latter are differentiated from 4-equivalent couplers by containing a substituent at the coupling site which is eliminated on coupling. 2-equivalent couplers are considered to be those which are colourless, as well as those which have an intense intrinsic colour which on colour coupling disappears or is replaced by the colour of the image dye produced (mask couplers), and white couplers which, on reaction with colour developer oxidation products, give rise to substantially colourless products. 2-equivalent couplers are further considered to be those which contain an eliminable residue at the coupling site, which residue is liberated on reaction with colour developer oxidation products and so either directly or after one or more further groups are eliminated from the initially eliminated residue (for example, DE-A-27 03 145, DE-A-28 55 697, DE-A-31 05 026, DE-A-33 19 428), a specific desired photographic effect is produced, for example as a development inhibitor or accelerator. Examples of such 2-equivalent couplers are the known DIR couplers as well as DAR or FAR couplers.

The material may, in addition to couplers, contain various compounds which, for example, may liberate a development inhibitor, a development accelerator, a bleach accelerator, a developer, a silver halide solvent, a fogging agent or an anti-fogging agent, for example so-called DIR hydroquinones and other compounds as are, for example, described in U.S. Pat. Nos. 4,636,546, 4,345,024, 4,684,604 and in DE-A-31 45 640, 25 15 213, 24 47 079 and in EP-A-198 438. These compounds fulfil the same function as the DIR, DAR or FAR couplers, except that they produce no coupling products.

High-molecular weight colour couplers are, for example, described in DE-C-1 297 417, DE-A-24 07 569, DE-A-31 48 125, DE-A-32 17 200, DE-A-33 20 079, DE-A-33 24 932, DE-A-33 31 743, DE-A-33 40 376, EP-A-27 284, U.S. Pat. No. 4,080,211. The high-molecular weight colour couplers are generally produced by polymerisation of ethylenically unsaturated monomeric colour couplers. They may, however, also be obtained by polyaddition or polycondensation.

The incorporation of couplers or other compounds into the silver halide emulsion layers may proceed by initially producing a solution, dispersion or emulsion of the compound concerned and then adding it to the pouring solution for the layer concerned. Selection of the appropriate solvent or dispersant depends on the particular solubility of the compound.

Methods for the introduction of compounds which are substantially insoluble in water by a grinding process are described, for example, in DE-A-26 09 741 and DE-A-26 09 742.

Hydrophobic compounds may also be introduced into the pouring solution by using high-boiling solvents, so-called oil formers. Appropriate methods are described, for example, in U.S. Pat. Nos. 2,322,027, 2,801,170, 2,801,171 and EP-A-0 043 037

Instead of high-boiling solvents, oligomers or polymers, so-called polymeric oil formers, may be used.

The compounds may also be introduced into the pouring solution in the form of filled latices. Reference is, for example, made to DE-A-25 41 230, DE-A-25 41 274, DE-A-28 35 856, EP-A-0 014 921, EP-A-0 069 671, EP-A-0 130 115, U.S. Pat. No. 4,291,113.

The non-diffusible inclusion of anionic water-soluble compounds (for example of dyes) may also proceed with the assistance of cationic polymers, so-called mordanting polymers.

Suitable oil formers are, for example, phthalic acid alkyl esters, phosphonic acid esters, phosphoric acid esters, citric acid esters, benzoic acid esters, amides, fatty acid esters, trimesic acid esters, alcohols, phenols, aniline derivatives and hydrocarbons.

Examples of suitable oil formers are dibutyl phthalate, dicyclohexyl phthalate, di-2-ethylhexyl phthalate, decyl phthalate, triphenyl phosphate, tricresyl phosphate, 2-ethylhexyldiphenyl phosphate, tricyclohexyl phosphate, tri-2-ethylhexyl phosphate, tridecyl phosphate, tributoxyethyl phosphate, trichloropropyl phosphate, di-2-ethylhexylphenyl phosphate, 2-ethylhexyl benzoate, dodecyl benzoate, 2-ethylhexyl-p-hydroxybenzoate, diethyldodecanamide, N-tetradecylpyrrolidone, isostearyl alcohol, 2,4-di-t-amylphenol, dioctyl acelate, glycerol tributyrate, iso-stearyl lactate, trioctyl citrate, N,N-dibutyl-2-butoxy-5-t-octyl aniline, paraffin, dodecyl benzene and diisopropylnaphthalene.

Each of the differently sensitised photosensitive layers may consist of a single layer or may also comprise two or more partial layers of silver halide emulsion (DE-C-1 121 470). Here, red-sensitive silver halide emulsion layers are often located closer to the film support than green-sensitive silver halide emulsion layers and these in turn are closer than blue-sensitive layers, wherein there is generally a non photosensitive yellow filter layer between the green-sensitive layers and the blue-sensitive layers.

In cases of suitably low intrinsic sensitivity of the green or red-sensitive layers, different layer arrangements may be selected, dispensing with the yellow filter layer, in which, for example, the blue-sensitive, then the red-sensitive and finally the green-sensitive layers follow each other on the support. The The non photosensitive interlayers generally located between layers of different spectral sensitivity may contain agents which prevent an undesirable diffusion of developer oxidation products from one photosensitive layer into another photosensitive layer with a different spectral sensitisation.

If there are several partial layers of the same spectral sensitisation, then they may differ in composition, particularly in terms of the type and quantity of silver halide grains. In general, the partial layer with the greater sensitivity will be located further from the support than the partial layer with lower sensitivity. Partial layers of the same spectral sensitisation may be adjacent to each other or may be separated by other layers, for example layers of different spectral sensitisation. Thus, for example, all high sensitivity and all low sensitivity layers may be grouped together each in a package of layers (DE-A-19 58 709, DE-A-25 30 645, DE-A-26 22 922).

The photographic material may also contain UV light absorbing compounds, optical whiteners, spacers, filter dyes, formalin scavengers, light stabilisers, antioxidants, $D_{min}$ dyes, additives to improve stabilisation of dyes, couplers, whiteners and to reduce colour fogging, plasticisers (latices), biocides and others.

UV light absorbing compounds are intended on the one hand to protect the colour dyes from bleaching by high-UV daylight and on the other hand to absorb the UV light in daylight on exposure and so improve the colour reproduction of a film. Customarily, compounds of different structure are used for the two tasks. Examples are aryl-substituted benzotriazole compounds (U.S. Pat. No. 3,533,794), 4-thiazolidone compounds (U.S. Pat. Nos. 3,314,794 and 3,352,681), benzophenone compounds (JP-A-2784/71), cinnamic acid ester compounds (U.S. Pat. Nos. 3,705,805 and 3,707,375), butadiene compounds (U.S. Pat No. 4,045,229) or benzoxazole compounds (U.S. Pat. No. 3,700,455).

Certain binder layers, in particular the layer furthest away from the support, but also occasionally interlayers, particularly if they constitute the layer furthest away from the support during manufacture, may contain photographically inert particles of an inorganic or organic nature, for example as flatting agents or spacers (DE-A-33 31 542, DE-A-34 24 893, *Research Disclosure* 17 643 (December 1978), section XVI).

The average particle diameter of the spacers is in particular in the range from 0.2 to 10 μm. The spacers are insoluble in water and may be soluble or insoluble in alkali, wherein the alkali-soluble spacers are generally removed from the photographic material in the alkaline developing bath. Examples of suitable polymers are polymethyl methacrylate, copolymers of acrylic acid and methyl methacrylate together with hydroxypropylmethylcellulose hexahydrophthalate.

Additives to improve the stability of dyes, couplers and whiteners and to reduce colour fogging (*Research Disclosure* 17 643 (December 1978), section VII) may belong to the following classes of chemical substances: hydroquinones, 6-hydroxychromanes, 5-hydroxycoumaranes, spirochromanes, spiroindanes, p-alkoxyphenols, sterically hindered phenols, gallic acid derivatives, methylene dioxybenzenes, aminophenols, sterically hindered amines, derivatives with esterified or etherified phenolic hydroxyl groups, metal complexes.

Compounds having both a sterically hindered amine partial structure and a sterically hindered phenol partial structure in one molecule (U.S. Pat. No. 4,268,593) are particularly effective in preventing the degradation of yellow colour images as a consequence of the development of heat, moisture and light. In order to prevent the degradation of magenta colour images, in particular their degradation due to the effects of light, spiroindanes (JP-A-159 644/81) and chromanes which are substituted by hydroquinone diethers or monoethers (JP-A-89 835/80) are particularly effective.

The layers of the photographic material according to the invention may be hardened. Suitable hardeners are, for example, formaldehyde, glutaraldehyde and similar aldehyde compounds, diacetyl, cyclopentadione and similar ketone compounds, bis-(2-chloroethylurea), 2-hydroxy-4,6-dichloro- 1,3,5-triazine and other compounds containing reactive halogen (U.S. Pat. Nos.3,288,775, 2,732,303, GB-A-974,723 and GB-A-1,167,207), divinylsulphone compounds, 5-acetyl-1,3-diacryloylhexahydro- 1,3,5-triazine and other compounds containing a reactive olefin bond (U.S. Pat. Nos. 3,635,718, 3,232,763 and GB-A-994,869); N-hydroxymethylphthalimide and other N-methylol compounds (U.S. Pat. Nos. 2,732,316 and 2,586,168); isocyanates (U.S. Pat. No. 3,103,437); aziridine compounds (U.S. Pat Nos. 3,017,280 and 2,983,611); acid derivatives (U.S. Pat. Nos. 2,725,294 and 2,725,295); compounds of the carbodiimide type (U.S. Pat No. 3,100,704); carbamoylpyridinium salts (DE-A-22 25 230 and DE-A-24 39 551); carbamoyloxypyridinium compounds (DE-A-24 08 814); compounds with a phosphorus-halogen bond (JP-A-113 929/83); N-carbonyloximide compounds (JP-A-43353/81); N-sulphonyloximido compounds (U.S. Pat. No. 4,111,926), dihydroquinoline compounds (U.S. Pat. No. 4,013,468), 2-sulphonyloxypyridinium salts (JP-A-110 762/81), formamidinium salts (EP-A-0 162 308), compounds with two or more N-acyloximino groups (U.S. Pat. No. 4,052,373), epoxy compounds (U.S. Pat. No. 3,091,537), compounds of the isoxazole type (U.S. Pat. Nos. 3,321,313 and 3,543,292); halogen carboxyaldehydes, such as mucochloric acid; dioxane derivatives, such as dihydroxydioxane and dichlorodioxane; and inorganic hardeners such as chrome alum and zirconium sulphate.

Hardening may be effected in a known manner by adding the hardener to the pouring solution for the layer to hardened, or by overcoating the layer to be hardened with a layer containing a diffusible hardener.

There are included in the classes listed slow acting and fast acting hardeners as well as so-called instant hardeners, which are particularly advantageous. Instant hardeners are understood to be compounds which harden suitable binders in such a way that immediately after pouring, at the latest after 24 hours, preferably at the latest after 8 hours, hardening is concluded to such an extent that there is no further alteration in the sensitometry and swelling of the layered structure determined by the crosslinking reaction. Swelling is understood as the difference between the wet layer thickness and the dry layer thickness during aqueous processing of the film (*Photogr. Sci. Eng.* 8 (1964), 275; *Photogr. Sci. Eng.* (1972), 449).

These hardeners which react very rapidly with gelatine are, for example, carbamoylpyridinium salts, which enable the free carboxyl groups of the gelatine to react, so that the latter react with free amino groups of the gelatine to form peptide bonds crosslinking the gelatine.

Colour negative photographic materials are customarily processed by developing, bleaching, fixing and rinsing or by developing, bleaching, fixing and stabilising without subsequent rinsing, wherein bleaching and fixing may be combined into a single processing stage. Colour developer compounds which may be used are all developer compounds having the ability to react, in the form of their oxidation product, with colour couplers to yield azomethine or indophenol dyes. Suitable colour developer compounds are aromatic compounds containing at least one primary amino group of the p-phenylenediamine type, for example N,N-dialkyl-p-pheneylenediamines such as N,N-diethyl-p-phenylenediamine, 1-(N-ethyl-N-methanesulphoneamidoethyl)- 3-methyl-p-phenylenediamine, 1-(N-ethyl-N-hydroxyethyl)- 3-methyl-p-phenylenediamine and 1-(N-ethyl-N-methoxyethyl)- 3-methyl-p-phenylenediamine. Further colour developers which may be used are, for example, described in *J. Amer. Chem. Soc.* 73, 3106 (1951) and G. Haist *Modern Photographic Processing*, 1979, John Wiley & Sons, New York, pages 545 et seq.

An acid stop bath or rinsing may follow after colour development.

Customarily, the material is bleached and fixed immediately after colour development. Bleaches which may be used are, for example, Fe(III) salts and Fe(III) complex salts such as ferricyanides, dichromates, water soluble cobalt complexes. Iron(III) complexes of aminopolycarboxylic acids are particularly preferred, in particular for example complexes of ethylenediaminetetraacetic acid, propylenediaminetetraacetic acid, diethylenetriaminepentaacetic acid, nitrilotriacetic acid, iminodiacetic acid, N-hydroxyethylethylenediaminetriacetic acid, alkyliminodicarboxylic acids and of corresponding phosphonic acids. Also suitable as bleaches are persulphates and peroxides, for example hydrogen peroxide.

Rinsing usually follows the bleaching-fixing bath or fixing bath, which is performed as countercurrent rinsing or consists of several tanks with their own water supply.

Favourable results may be obtained by using a subsequent finishing bath which contains no or only a little formaldehyde.

Rinsing may, however, be completely replaced with a stabilising bath, which is customarily performed countercurrently. If formaldehyde is added, this stabilising bath also performs the function of a finishing bath.

With colour reversal materials, there is an initial development with a black and white developer, the oxidation product of which is not capable of reacting with the colour couplers. There then follows a diffuse second exposure and then development with a colour developer, bleaching and fixing.

The polymer blend according to the invention may be considered for shaped articles other than supports for image information layers, for example yarns, rods, tubes and bottles.

Examples

Example 1

(comparison)

Commercially available PE paper (thickness 240 μm) was provided with poured photographic layers. The values shown in the table were obtained after exposure with a photographic test pattern.

Example 2

(comparison)

Polyethylene terephthalate was blended with 15 wt.%, related to the total weight of constituents used, of isotactic polypropylene in a tumble drier and dried.

This blend was melted in a PET extruder and extruded through a slot. The film was then stretched longitudinally. A subbing layer was poured onto this film, which layer was prepared from a copolymer of 88 wt.% vinylidene chloride, 10 wt.% methacrylic acid and 2 wt.% itaconic acid and 10 wt.%, related to the copolymer, of colloidal $SiO_2$ and the film was then stretched transversely. Both stretching operations were performed at 100° C. with a stretching ratio of 3.3. The film was then heat-set for 1 minute at 160° C., cooled and provided with photographic layers in a customary manner.

Subsequent treatment was as in example 1.

Example 3

(according to the invention)

Example 2 was repeated with the difference that polypropylene was replaced with the same quantity of SAN resin (product C)) and the polymer blend was dried at 75° C.

Example 4

(according to the invention)

Example 3 was repeated with the difference that polypropylene was replaced with the same quantity of HIPS.

Example 5

(according to the invention)

Example 3 was repeated with the difference that polypropylene was replaced with the same quantity of ABS-1.

Example 6

(according to the invention)

Example 3 was repeated with the difference that polypropylene was replaced with the same quantity of ABS-2.

Example 7

(according to the invention)

Example 6 was repeated with the difference that, instead of the polyethylene terephthalate, the same quantity of a blend of 94 wt.% of the same polyethylene terephthalate and 6 wt.% of polyethylene isophthalate was used.

Example 8

(according to the invention)

Example 7 was repeated with the difference that the quantity of ABS-2 was increased to 20 wt.%.

Example 9

(according to the invention)

Example 8 was repeated with the difference that 2.5 wt.%, related to total weight, of titanium dioxide pigment was added to the polymer blend.

Example 10

(according to the invention)

Example 9 was repeated with the difference that the quantity of titanium dioxide pigment was increased to 5 wt.%.

The following methods Were used to determine the measured values.

Film thickness

Measurement with a thickness gauge at five different points on the film and subsequent averaging.

Opacity (optical density)

Transmission density $D_t$=log 1/t was determined using a McBeth transmission densitometer, model TD 404, behind blue filter 94; calibration to 0.00 with zero adjust, to 2.00 with Schott filter NG-2.

Crease resistance

Size of test samples: width x length 89×235 mm. The film is drawn over the test roller once on its reverse side with the bend defined by the diameter of the test roller. The test rollers used range in diameter down to 2 mm. The smallest diameter is stated at which no surface damage is yet observable with the naked eye. The film is visually examined for residual damage such as creases, half moons and bridges.

Image sharpness (contrast/transfer function)

The contrast/transfer function is measured. Assessment criterion 8 lines/mm for yellow/magenta/cyan.

The measurement method is described in T. H. James, *The Theory of the Photographic Process,* 4th edition, Macmillan, New York, 1977, p. 596, 604–606. The film is exposed with a rectangular pattern. Evaluation is made with a reflection microdensitometer. The higher the values, the better is the sharpness.

wet adhesion—X test

Testing of adhesion of layer structure to substrate, thus to emulsion coated substrate. Black sheets: development CD92/40° C./3 min;-followed by rapid rinsing. An X is scratched on the coated side of the moist sample with a pointed plastic pin. A flat rubber bung is then rubbed over the point marked with the X. The fewer the tears from the X, the better is the adhesion. Values are awarded on a comparative scale from 1 (very good) to 5 (poor).

TABLE

| Example | 1 | 2 | 3 | 4 | 5 | 6 | 7 | 8 | 9 | 10 |
|---|---|---|---|---|---|---|---|---|---|---|
| Thickness (μm) | 240 | 195 | 203 | 205 | 192 | 201 | 203 | 197 | 196 | 202 |
| Opacity | 2.4 | 1.6 | 1.8 | 2.0 | 2.1 | 2.0 | 2.1 | 2.2 | 2.6 | 3.0 |
| Crease resistance (φ in mm) | 2 | 10 | 8 | 9 | 3 | 3 | 3 | 3 | 3 | 3 |
| Optical sharpness | | | | | | | | | | |
| yellow | 36 | 23 | 25 | 27 | 26 | 27 | 28 | 25 | 29 | 33 |
| magenta | 44 | 31 | 34 | 36 | 35 | 36 | 37 | 34 | 38 | 42 |
| cyan | 35 | 25 | 27 | 28 | 27 | 25 | 26 | 26 | 29 | 30 |
| Wet adhesion | 2 | 5 | 2 | 2 | 2 | 2 | 2 | 2 | 2 | 2 |

Commercial PE paper exhibits at relatively high thickness moderate opacity, good crease resistance, sharpness and wet adhesion. While thickness may be reduced by using a polyester/polypropylene blend, its properties are dramatically impaired. It is only with the supports according to the invention that properties are achieved with the same reduced thickness which match or even surpass those of PE paper (examples 3 to 10).

The poured photographic layers were of the following composition:

Layered structure 1:
 1st layer (substrate layer):
 0.2 g gelatine
 0.07 g colloidal SiO$_2$
 2nd layer (blue-sensitive layer)
 Blue-sensitive silver halide emulsion (99.5 mol.% chloride, 0.5 mol.% bromide, average-grain diameter 0.8 μm) prepared from 0.63 g AgNO$_3$ with
 1.38 g gelatine
 0.95 g yellow coupler
 0.29 g tricresyl phosphate (TCP)
 3rd layer (protective layer)
 1.1 g gelatine
 0.06 g 2,5-dioctylhydroquinone
 0.05 g dibutyl phthalate (DBP)
 4th layer (green-sensitive layer)
 Green-sensitised silver halide emulsion (99.5 mol.% chloride, 0.5 mol.% bromide, average grain diameter 0.6 μm) prepared from 0.45 g AgNO$_3$ with
 1.08 g gelatine
 0.41 g magenta coupler
 0.34 g DBP
 0.04 g TCP
 5th layer (UV protective layer)
 1.15 g gelatine
 0.6 g UV absorber
 0.04 g TCP
 6th layer (red-sensitive layer)
 Red-sensitised silver halide emulsion (99.5 mol.% chloride, 0.5 mol.% bromide, average grain diameter 0.5 μm) prepared from 0.3 g AgNO$_3$ with
 0.75 g gelatine
 0.36 g cyan coupler
 0.36 g TCP
 7th layer (UV protective layer)
 0.35 g gelatine
 0.15 g UV absorber
 0.2 g TCP
 8th layer (protective layer)
 0.9 g gelatine
 0.3 g hardener H of the following formula

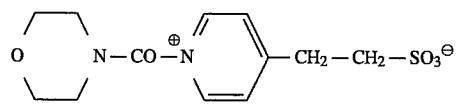

We claim:

1. Shaped article prepared from a polymer blend of 50 to 97 wt.% of a linear polyester and 3 to 50 wt.% of a polymer containing styrene, wherein the percentages relate to the sum of the polyester and the polymer containing styrene, wherein the polymer containing styrene contains 54 to 63 wt.% styrene and 12.5 to 25 wt.% of an elastomer, the remainder to 100 wt.% being acrylonitrile, and wherein the portion containing styrene is not crosslinked.

2. Shaped article according to claim 1, characterised in that the shaped article is a biaxially stretched support for image information layers.

3. Shaped article according to claim 1, characterised in that the shaped article is a photographic, biaxially stretched support material.

4. Photographic support material according to claim 3, characterised in that the polymer containing styrene is a graft copolymer prepared from acrylonitrile, butadiene and styrene (ABS).

5. Shaped article according to claim 1, characterised in that the polyester contains at least 80 wt.% polyethylene terephthalate and may contain up to 20 wt.% polyethylene isophthalate.

6. Shaped article according to claim 1 prepared from 77 to 88 wt.% of linear polyester and 12 to 23 wt.% of polymer containing styrene.

7. Support according to claim 2, characterised in that the polyester is stretched in both directions by 2 to 5 times.

8. Photographic material with a support and at least one silver halide emulsion layer applied thereto, characterised in that a support according to claim 2 is used.

9. Colour photographic silver halide material with a support and at least one red-sensitive, one green-sensitive and one blue-sensitive silver halide emulsion layer, optionally together with interlayers and protective layers, characterised in that a support according to claim 2 is used.

10. Biaxially stretched support for image information layers according to claim 2, which contains applied to at least one side a layer of polyester which contains no polymer containing styrene.

* * * * *